US009719695B2

(12) United States Patent
Sylvan

(10) Patent No.: US 9,719,695 B2
(45) Date of Patent: Aug. 1, 2017

(54) SOLAR THERMAL PANEL WITH SELF SUPPORTING DUAL AIR CHANNELS

(71) Applicant: Zonbak LLC, Needham, MA (US)

(72) Inventor: John E. Sylvan, Needham, MA (US)

(73) Assignee: Zonbak LLC, Needham, MA (US)

( * ) Notice: Subject to any disclaimer, the term of this patent is extended or adjusted under 35 U.S.C. 154(b) by 557 days.

(21) Appl. No.: 14/145,366

(22) Filed: Dec. 31, 2013

(65) Prior Publication Data

US 2015/0184893 A1 Jul. 2, 2015

(51) Int. Cl.

| F24J 2/20 | (2006.01) |
|---|---|
| F24J 2/04 | (2006.01) |
| F24J 2/40 | (2006.01) |
| F24J 2/46 | (2006.01) |
| F24J 2/50 | (2006.01) |
| F24J 2/51 | (2006.01) |
| F24J 2/22 | (2006.01) |
| F24F 5/00 | (2006.01) |

(52) U.S. Cl.
CPC ............... *F24J 2/20* (2013.01); *F24J 2/0444* (2013.01); *F24J 2/0483* (2013.01); *F24J 2/22* (2013.01); *F24J 2/402* (2013.01); *F24J 2/465* (2013.01); *F24J 2/506* (2013.01); *F24J 2/515* (2013.01); *F24F 2005/0064* (2013.01); *Y02B 10/20* (2013.01); *Y02E 10/44* (2013.01)

(58) Field of Classification Search
None
See application file for complete search history.

(56) References Cited

U.S. PATENT DOCUMENTS

| 2,659,392 A | 9/1947 | Frenkel |
| 2,984,599 A | 5/1961 | Edwards et al. |
| 3,597,591 A | 8/1971 | Ven Derlip |
| 3,875,925 A | 4/1975 | Johnston |
| 3,908,631 A | 9/1975 | Rom |
| 4,003,367 A | 1/1977 | Wikholm |
| 4,019,494 A | 4/1977 | Safdari |
| 4,036,209 A | 7/1977 | Press |
| 4,051,834 A | 10/1977 | Fletcher et al. |
| 4,133,914 A | 1/1979 | Zani |
| 4,159,709 A | 7/1979 | Palazzetti |
| 4,160,443 A | 7/1979 | Brindle et al. |
| 4,182,307 A | 1/1980 | Brindle et al. |

(Continued)

*Primary Examiner* — David J Laux
(74) *Attorney, Agent, or Firm* — Hamilton, Brook, Smith & Reynolds, P.C.

(57) ABSTRACT

A low profile flexible solar thermal panel has low-cost, thin sheet foil and film materials fabricated as an integrated airtight solar thermal panel and a dual-port bifurcated duct adapter and formed metal foil air passages. The bifurcated air duct and formed metal foil layer enables, the panel to require only a single duct orifice through a mounting surface (such as a roof or wall) to provide both ingress and egress for air flow. The formed metal foil layer supplies a rigid support for two laminar air passages that steer forced air from the ingress port through a lower laminar air passage and returns it through the upper laminar air passage to the egress port in the bifurcated duct. The air duct enables measurement of the inlet air temperature, outlet air temperature and circulated air volume, further enabling electronic measurement of total energy produced in standard units.

21 Claims, 11 Drawing Sheets

(56) References Cited

U.S. PATENT DOCUMENTS

| | | | |
|---|---|---|---|
| 4,191,169 A | | 3/1980 | Hyman |
| 4,203,425 A | | 5/1980 | Clark |
| 4,205,655 A | * | 6/1980 | Hunt ........................ F24J 2/055 |
| | | | 126/635 |
| 4,207,867 A | * | 6/1980 | Hanks .................... F24J 2/0477 |
| | | | 126/623 |
| 4,219,012 A | | 8/1980 | Bergen |
| 4,233,963 A | | 11/1980 | Werner |
| 4,237,863 A | | 12/1980 | Harrison |
| 4,257,396 A | * | 3/1981 | Reinert .................. F24J 2/0444 |
| | | | 126/625 |
| 4,387,703 A | * | 6/1983 | Poole ......................... F24J 2/20 |
| | | | 126/632 |
| 4,458,673 A | | 7/1984 | Benjamin |
| 4,473,064 A | | 9/1984 | Jacques |
| 4,485,804 A | | 12/1984 | Sharpe |
| 4,495,936 A | | 1/1985 | Frommhold |
| 4,807,591 A | | 2/1989 | Stranicky |
| 5,388,567 A | | 2/1995 | Hodak |
| 5,397,408 A | | 3/1995 | Guzik et al. |
| 6,450,393 B1 | | 9/2002 | Doumanidis et al. |
| 8,049,120 B2 | | 11/2011 | Prest et al. |
| 8,191,547 B2 | | 6/2012 | Pellegrino |
| 8,191,757 B2 | | 6/2012 | Lewis et al. |
| 9,243,815 B1 | * | 1/2016 | Sylvan ....................... F24J 2/36 |
| 2011/0297299 A1 | | 12/2011 | Lippy et al. |
| 2014/0116561 A1 | * | 5/2014 | Krall ....................... F16L 39/04 |
| | | | 138/114 |

\* cited by examiner

CROSS SECTION AA

CROSS SECTION BB

SOLAR THERMAL PANEL WITH SELF SUPPORTING DUAL AIR CHANNELS

BACKGROUND OF THE INVENTION

Solar thermal panels capture solar radiation in the form of heat. An absorber, typically a metal plate or foil coated with a specialized solar absorber or black paint, converts the solar radiation into heat by way of solar adsorption. The absorbed heat can be used directly for space heating, hot water generation, or solar air conditioning. Solar thermal hot water heaters typically circulate a fluid, such as water or antifreeze, in a closed loop system to transfer the accumulated heat from a solar panel to an interior of a building or fluid storage tank. Hot air solar thermal systems circulate air to transfer accumulated heat to an interior of a building or heat storage system.

A liquid fluid solar thermal system typically requires only two small holes to be drilled in mounting surface (roof, wall or other support structure) that are less than 1" in diameter. One hole is for a cold liquid feed to a solar thermal panel and the other is for the hot liquid return from the panel. Heat can be efficiently transferred in a liquid and as a result the plumbing lines can have small diameters or cross sectional areas. In contrast, solar hot air thermal panels require large diameters or large cross-sectional area ducts to efficiently transfer heat due to the lower energy density of hot air as compared to hot water. Because the panels are installed externally onto a structure and the heat is used internally within the structure, the air solar thermal systems require two large holes, typically 6" to 8" in diameter cut in a roof, wall or other external support structure. One hole is for the cold air feed duct and the other hole is for the hot air return duct. Any hole cut in a roof or wall may create ingress for water resulting in leakage and other weather damage. Furthermore, the additional labor required to install the two holes versus just one adds to the cost of the solar installation. With a fluid system, the small diameter holes can be drilled and then sealed with caulk. With an airflow system, the two larger holes are preferably be drilled and cut with a saw, the mounting surface reflashed or shingled, and then the entire installation caulked for weatherproofing. In addition, with a two-hole design, the holes in both the mounting surface and the solar thermal panel is preferably precisely aligned thereby complicating the installation process.

In a solar thermal panel, the heat transfer fluid (liquid or air) should travel the maximum length of the solar absorber to absorb heat. The larger the heat transfer surface area the transfer fluid comes in contact with, the more efficient the heat transfer process becomes. In a liquid fluid system, the fluid typically travels through a serpentine pattern of tubes that are welded to the solar absorber. In an air-based solar thermal panel the air typically transverses the length of the panel. Air enters at the bottom of the panel through an inlet duct and out of the top of the panel through an outlet duct. During this process, the air picks up the heat generated by the solar absorber. The panel, however, requires a separate inlet and an outlet duct that are separated by a distance equal to the length of the panel. Alternatively, a series of air baffles can be incorporated into the panel to allow the air enter and exit at any point in the panel.

One of the major cost factors in any solar thermal panel is the cost of the solar glazing. Solar thermal panels typically employ low-iron solar glass, which permits solar radiation to strike the solar absorber but prevents heat, usually in the form of infrared radiation, from escaping. Alternatives to utilizing low-iron solar glass include transparent plastics rigid sheets, such as lexan or other polycarbonate plastic, and high-temperature optical films, such as PTFE or PVDF. However, transparent plastics often do not have the required service temperature rating and yellow with age and thin films, often only a few millimeters thick, for use in a solar thermal panel requires a method allowing automatic tensioning of the film. Without tensioning, the film will have reduced operating lifetime.

SUMMARY OF THE INVENTION

The present invention provides a means to fabricate very thin and lightweight solar thermal panel that incorporates a dual-port bifurcated air duct system and formed metal-foil for rigidly supported air passages. With a bifurcated duct the panel may be installed on a roof, wall or other structural support and requires only a single orifice for both the inlet and outlet airflow. This allows for the reduction of the installation costs and complexity of the installation and also minimizes the possibility of water leaks via the duct hole.

With the bifurcated duct design, the air enters an inlet duct and flows into a rigidly supported air passage between the formed metal sheet and the insulated back of the panel. In this lower air passage, the air transverses the entire length of the panel. At the end of the passage the air flows through holes or a gap in formed metal sheet to the air passage above. It then travels in the opposite direction through a rigidly supported air passage between the solar absorber and formed metal sheet. As the air travels through this upper air passage, it absorbs the heat generated by the solar radiation incident upon the metal absorber. The heated air then exits the panel through the exit duct in the bifurcated duct port. A duct adapter on the inside of the roof, wall or other support structure provides for isolated connections to two separate air ducts; one for cold air inflow and the other for the heated air return.

To prevent restricting the airflow, the formed metal foil that separates the bidirectional airflow provides rigid support to maintain a fixed air-passage height on both sides of the formed metal foil sheet. The forming process provides for rigid support that minimally restricts the airflow while at the same time permitting the formed metal foil to bend, providing flexibility. In the specific embodiment the entire solar thermal panel is flexible, does not require structural frame for internal support and weighs less than a pound per square meter. By forming bidirectional rigid support features on both sides of the panel there are no additional materials, components or other costs that add to the total manufacturing cost of the panel. The forming process is accomplished with an inexpensive sheet metal die press or other stamping operation that deforms the metal foil at specific locations in opposing directions.

In the place of rigid, heavy solar glass, the preferred embodiment of the invention employs a light and flexible PTFE or PVDF film as the panel's glazing. With optical clarity equal to low-iron solar glass, PTFE film may operate as glazing even with thicknesses less than 0.002" and weight of less than ounce per square meter. The drawback of a PTFE or other plastic thin film glazing, however, is that the film should be tensioned to supply rigidity. Without tensioning, it "flaps" in the wind, degrading its reliability. It also has poor cosmetic appeal when not tensioned. Structural uses of PTFE or other plastic films such as PVDF typically use inflated sealed two-member panels, but the complexity and cost of this approach precludes their use in solar thermal panels. A lower cost and simpler technique used in the invention is a spring tension system that tensions the panel in one direction along its length while proving an airtight pressure seal at both ends of the panel.

Because a solar thermal panel generates heat only when there is solar radiation (sunlight) available, a means of measuring the internal temperature of the panel is required. Air should only circulate through panel when there is sufficient solar radiation to raise the air temperature within the panel above a desired threshold. The invention therefore incorporates integrated temperature sensors that provide for monitoring of panel's internal temperature, inlet air temperature, and outlet air temperature. To measure the amount of heat supplied it also incorporates an airflow sensor to perform measurements of BTUs (British Thermal Units) or another heat measurement standard. This value is calculated from the difference between inlet airflow temperature and outlet airflow temperature and the airflow in cubic feet or cubic meters per minute.

BRIEF DESCRIPTION OF THE DRAWINGS

The foregoing will be apparent from the following more particular description of example embodiments of the invention, as illustrated in the accompanying drawings in which like reference characters refer to the same parts throughout the different views. The drawings are not necessarily to scale, emphasis instead being placed upon illustrating embodiments of the present invention.

Other objects, features, and advantages will occur to those skilled in the art from the following description of the preferred embodiments and accompanying drawings in which.

DETAILED DESCRIPTION OF THE INVENTION

A description of example embodiments of the invention follows.

While this invention has been particularly shown and described with references to example embodiments thereof, it will be understood by those skilled in the art that various changes in form and details may be made therein without departing from the scope of the invention encompassed by the appended claims.

Although the present invention has been shown and described with respect to several preferred embodiments thereof, various changes, omissions and additions to the form and detail thereof, may be made therein, without departing from the spirit and scope of the invention.

Figure 1:
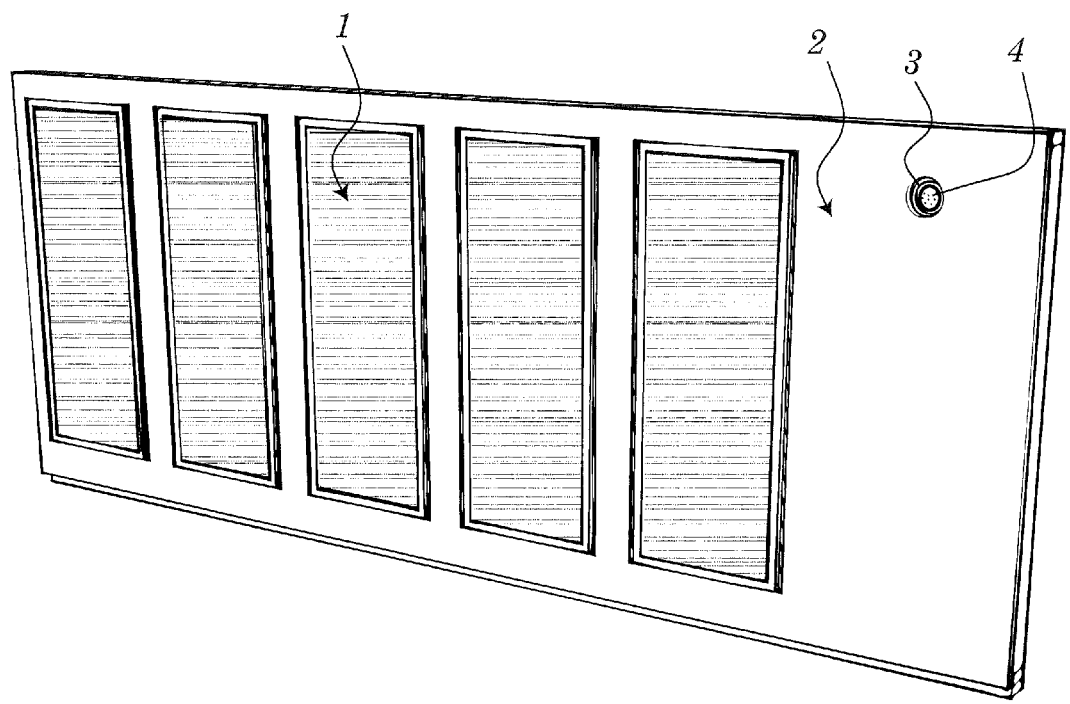
FIG. 1 is a general view of the flexible solar panel of this invention mounted on an exterior wall of a structure with single coaxial or bifurcated duct port hole.

FIG. 1 shows flexible solar thermal panels 1 mounted on an exterior wall 2. Alternatively, the exterior wall 2 could be a roof or other support structure. To provide for airflow through the solar thermal panel there are preferably be two air ducts from the inside of the structure to the panel: one for a cold air feed and the other for a hot-air return. Typically this would require two large diameter holes to be cut through the mounting surface 2. In a preferred embodiment, shown in FIG. 1, there is only a single large diameter hole 3. Through this hole 3 are attached bifurcated ducts. A coaxial bifurcated arrangement employs one duct of a smaller diameter coaxially centered within a larger duct of greater diameter. Mounted on the interior wall or support structure 2 is a dual-port duct adapter 4 with bifurcated ports that connect to the back coaxial port of solar thermal panel 1. The dual-port duct adapter 4 converts airflow from two separate air ducts into airflow through the single bifurcated or coaxial duct port 3.

Figure 2:
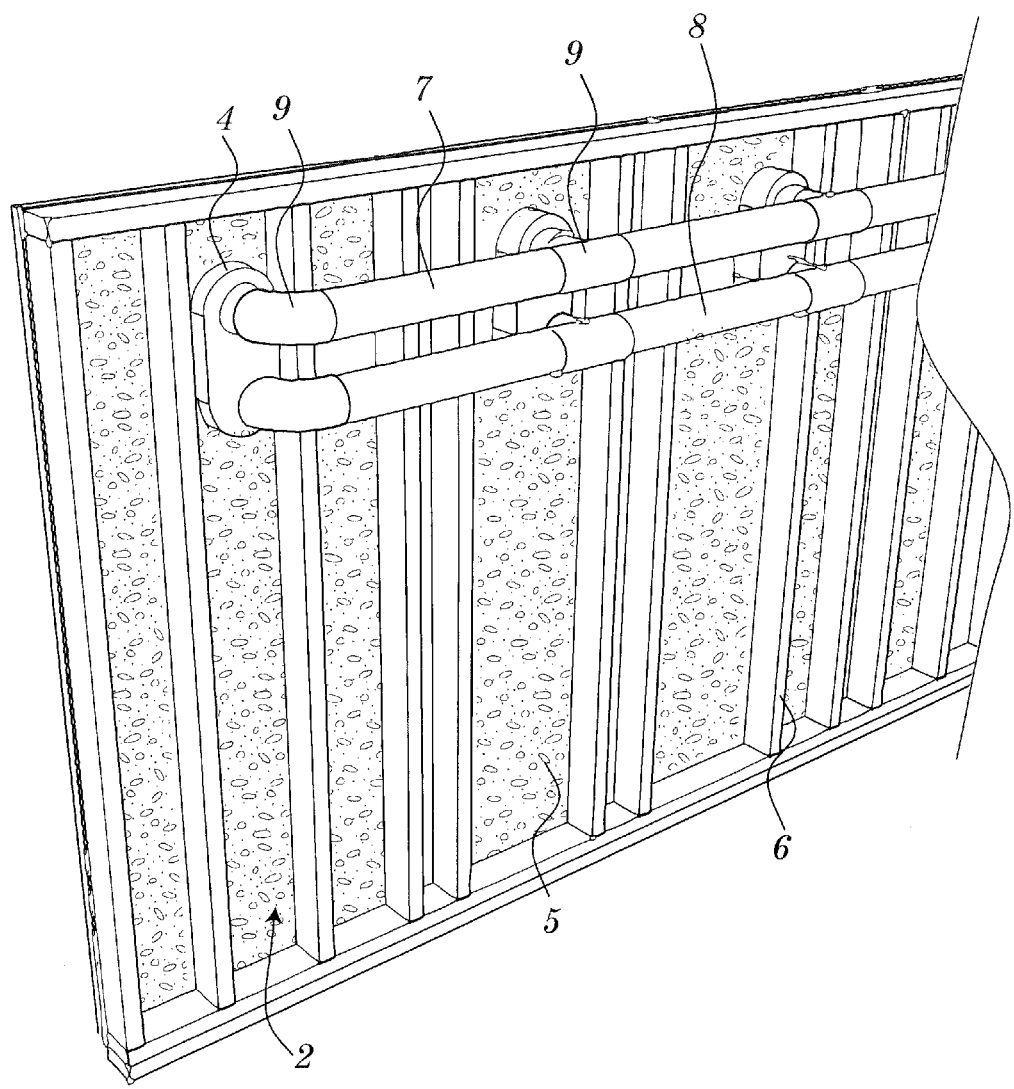
FIG. 2 is an interior wall view of a panel duct mounting and duct system with cold air feed and heated air-return ducts.

FIG. 2 illustrates an internal structural view of the duct system. The dual-port duct adapter 4 is mounted on the interior surface 5 of a wall, roof or other support structure 2. A single orifice 3 connects to a solar thermal panel 1 through a support structure 2. The wall, roof or other support structure may or may not include rigid support members 6. Non-limiting examples of rigid support members include 2"×4" or 2"×6" wooden studs. The dual-port duct adapter 4 should be appropriately sized to fit within a cavity between support members 6 and beneath a wall material such as drywall. In residential construction, the support members may be 2"×4" wooden studs, which corresponds to an actual dimension of 1.5"×3.5". The space from center to center of support beams 6 may be, for example, about 14". Consequently, the dual-port duct adapter 4 may have a height between about 3.5" and about 12".

Connected to the dual-port duct adapter 4 are two separate air ducts 7 and 8. As shown in FIG. 2, the ducts are round, but they may also be any other shape (e.g., rectangular) that has a sufficient cross sectional area for the required airflow. The principle of bifurcated ducts would also apply to ducts of other shapes, such as square ducts, rectangular and rectangular ducts, and to a dual-port duct adapter 4 of any shape or size. The inlet and outlet air ducts and passages may have the same or different cross-sectional areas. The key feature is to accommodate two independent air ducts that do not allow the inlet and outlet airflow to mix.

Duct 7 provides a return air path for heated air and duct 8 is the cold air supply duct. The ducts are attached to the duct dual-port adapter 4 using duct adapters 9. The T-adapters or elbow connectors permit connection of multiple or single panels 1 to a single hot air return duct 7 and cold air feed duct 8. In operation, air is drawn in, under negative air pressure, through duct 8 and the duct adapter 4 into a panel 1 where it is heated via solar radiation (e.g., sunlight). The forced heated air then returns through the duct dual-port adapter 4 and the heated air return duct 7. The heated air may be circulated into a room directly, connected to a building-wide air ventilation system, or used to generate hot water with an air-to-water heat exchanger.

Figure 3:
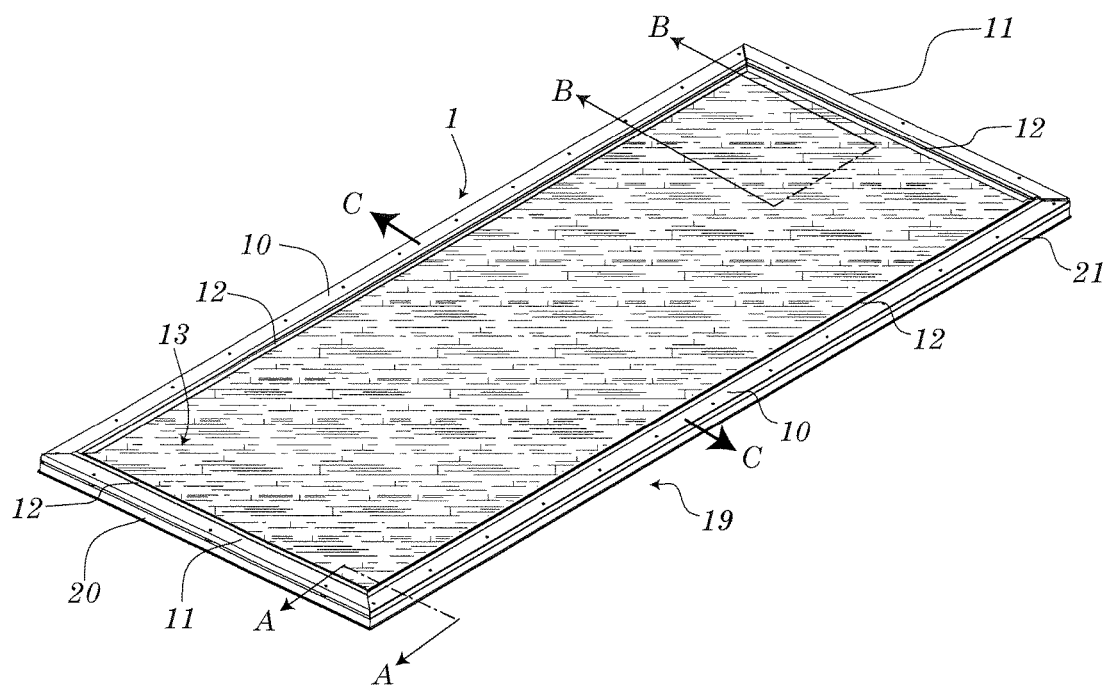
FIG. 3 is a view of an assembled solar thermal panel with mounting hardware and a flexible solar thermal panel.

FIG. 3 is a detailed illustration of a solar thermal panel 1. The panel 1 comprises a flexible panel insert 13 of multiple layers and a rigid support frame 19. The multiple layers of panel insert 13 are shown in an exploded view in FIG. 4. The rigid frame 19 supports the flexible panel 13 and allows attachment to an exterior wall or roof 2. In one embodiment, the frame comprises eight aluminum extrusions, two at each vertical side and two at each horizontal side. Around the entire interior perimeter of frame 19 is a flexible gasket 12. Examples of flexible gaskets include, but are not limited to, rubber, silicone, or any other flexible gasket material. The vertical metal extrusions 21 and horizontal bottom metal extrusions 20 are affixed to a mounting surface 2 by a series of bolts or screws. The two top vertical metal extrusions 11 connect to the bottom vertical metal extrusions 20 via a series of bolts and standoffs or other mounting hardware. The hardware allows the vertical metal extrusions to be held rigidly in place. Gasket 12 supplies a positive sealing pressure at the ends of flexible panel 13 preventing any air egress. The two top vertical metal extrusions 10 connect to panel 13 and are mounted to the side metal extrusions 21 via a series of posts and spring mechanisms, permitting the metal extrusions 10 to move laterally in opposing direction C, thereby automatically tensioning flexible solar panel 13 along its length in direction C.

Figure 4:
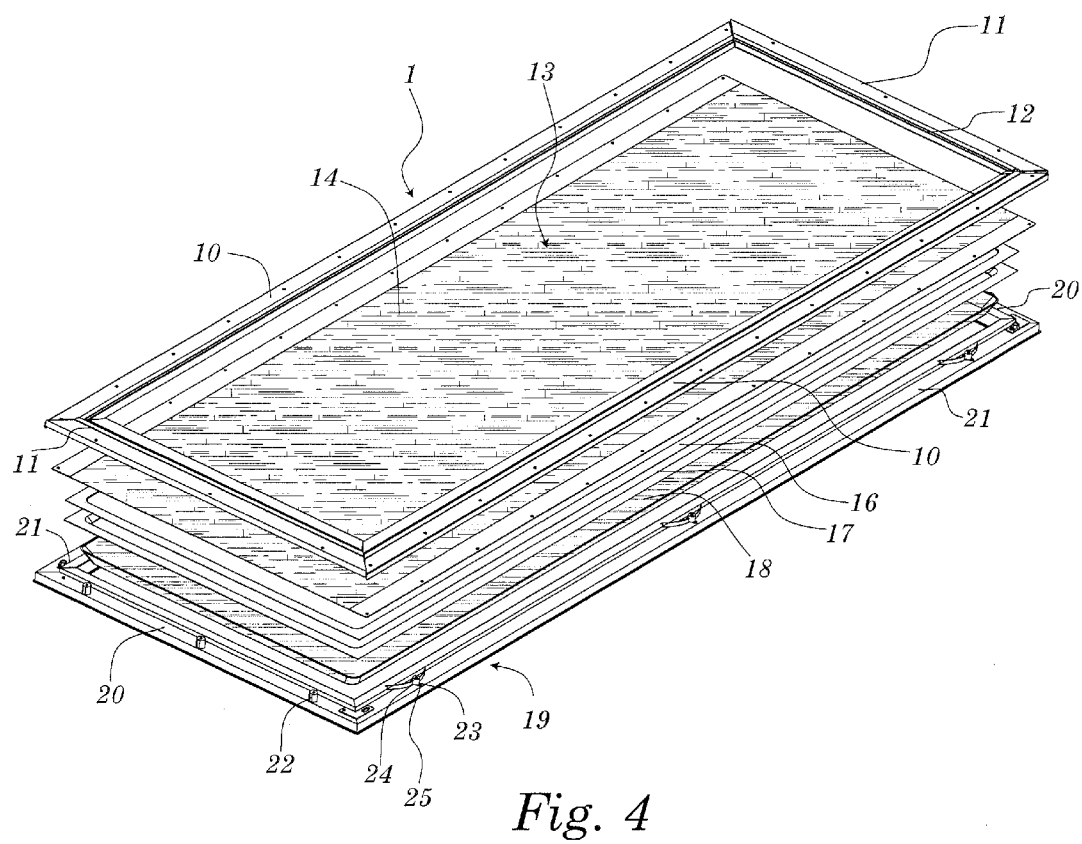
FIG. 4 is an exploded view of a solar thermal panel illustrating the constituent layers of the panel and the assembly components.

FIG. 4. is an exploded view of panel 1. The flexible panel 13 comprises a PTFE optically clear film with metal wear foil strips 14, a formed metal foil solar absorber 16 that converts incident solar radiation into heat, a formed metal layer 17 to supports two rigid air passages, and a thin flexible insulator 18.

The top layer of the solar absorber 16 is coated with a specialized black absorber material that allows conversion of incident solar radiation into heat via the process of absorption. When exposed to sunlight, this foil absorber will heat up, and the heat is transferred to its back surface via heat conduction. To prevent the heat from escaping out the top surface of 13, the optically clear PTFE film layer 14 operates as a flexible, optical glazing. The PTFE film permits solar ultraviolet radiation to pass through it, but prevents heat in the form of infrared radiation from escaping. Layer 18 not only provides insulation by preventing heat loss out of the back surface of panel 13 but it also protects mounting surface 2 from excessive heat. Layer 18 may comprise a single metallized insulator foil or a multi-layer construction of metal foils and a thin thermal insulator. Due the fibrous nature of most insulators, a metal surface added to insulator 18 is required to prevent dangerous fiber contamination of the air circulation. In one embodiment, the insulator for 18 comprises a 0.125" thick aluminized ceramic oxide insulator. The insulation layer may also contain an opening for connection of the inlet duct of dual-port adapter 4. The openings in the insulation layer will correlate with the shape of the inlet duct of dual-port adapter 4. For example, if the inlet ducts of dual-port adapter 4 are round, then the holes in the insulation layer will be coaxial and of a larger diameter than hole 29 in layer 17.

Figure 5:
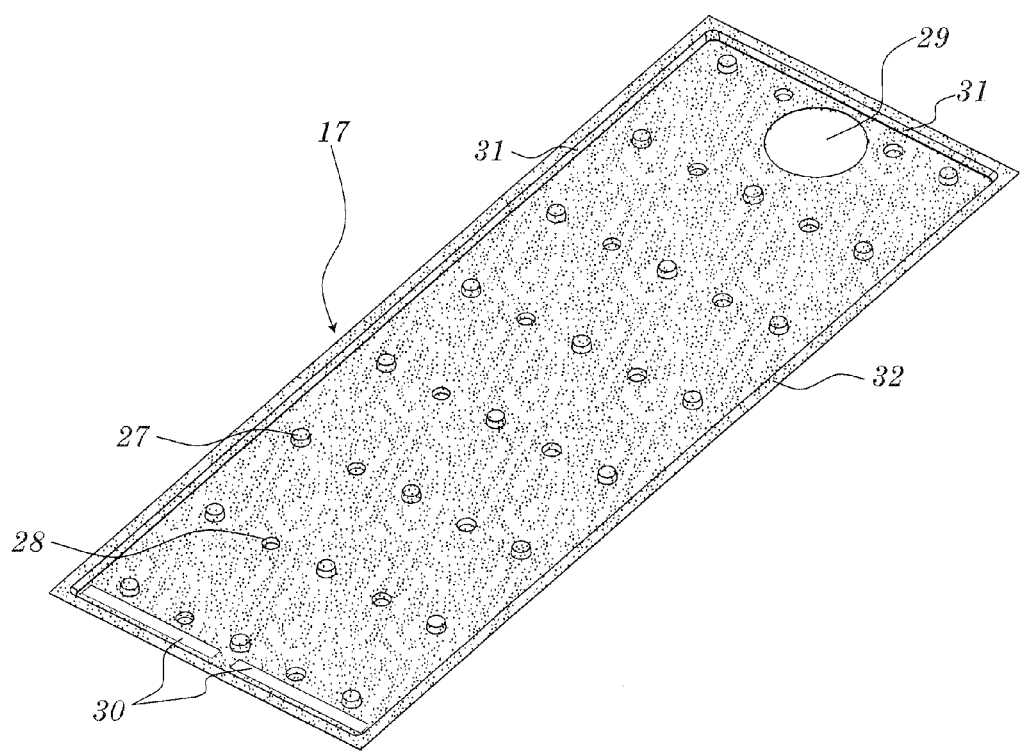
FIG. 5 shows the features of the formed metal foil layer in the solar thermal panels that provides a rigid support for laminar airflow channels above and below the layer. Holes in the panel provide for flow between the upper and lower channels and egress for heated air.

The intermediate layer 17 divides the interior of panel 13 into two separate rigid air passages. In the lower passage, air enters between the top of 18 and bottom of 17, flows down the length of the panel, travels through perforations in 17, and returns via an upper air passage formed between layers 16 and 17. Because the upper air passage is coincident to heated bottom surface of solar absorber 16, the circulated air will be heated as it travels along this upper passage. With full solar exposure, the air temperature may rise about 100° F. or more as it transverses the length of the panel 1. FIG. 5 illustrates the features of 17 that create these rigid air passages.

The vertical side metal extrusions 10 and horizontal bottom metal extrusions 11 hold the flexible panel 13 in place and also provide tensioning of the optically clear film layer 14. Tensioning of the film is accomplished by a series of slots 23, support posts 25 and springs 24. In one embodiment, there are three of tensioning features on each side, for a total of six. (FIG. 4) In another embodiment, there are two tensioning features on each side, for a total of four. A screw or bolt inserted through 21 from the bottom and through 10 on top captures the spring mechanism and locks the top vertical side extrusions 10 in place. Preferably the springs for tensioning the optically clear film layer 14 are compression springs; more preferably expansion springs, most preferably metal spring forms. The solar thermal panel 1 requires automatic tensioning of the film layer 14 due to the different coefficients of thermal expansion between the metal films in 16 and 17 and the PTFE film. Without tensioning, the clear film may sag when heated thereby reducing the functionality, long-term reliability, and cosmetic appearance of solar thermal panel 1.

FIG. 5 shows the formed middle foil layer 17 of panel 14. The layer contains formed features 27 and 28 that provide rigid support for air passages above and below formed metal foil 17. These formed features may be of any shape (e.g., conical as shown or half spherical). Features 27 are formed upwards in the foil, while features 28 are formed in the opposing downward direction. Both features may be formed simultaneously or sequentially using a die press or other metal forming technique known to one of skill in the art. Forming the directionally opposing features 27 and 28 in the metal foil provides an economical method for generating a rigid support for two air passages while maintaining flexibility of the layer 17 and the entire panel 1 when flexible foils, films, and insulators are used as the other layers. The sidewalls 31 may be the same depth as the height of features 27. The top lip 32 around the perimeter of 17 provides a surface for sealing formed panel 17 to absorber 16. Hole 29 provides access to the inner coaxial duct of dual-port duct adapter 4 for air egress from panel 1. Slots 30 permit the air to flow from lower passage 59 to upper passage 60. Slot 30 is may be a slot or any other shape that allows air flow or alternatively slot 30 a gap created by reducing length of 17 relative to overall length of the overall length of flexible panel 14.

Figure 6:
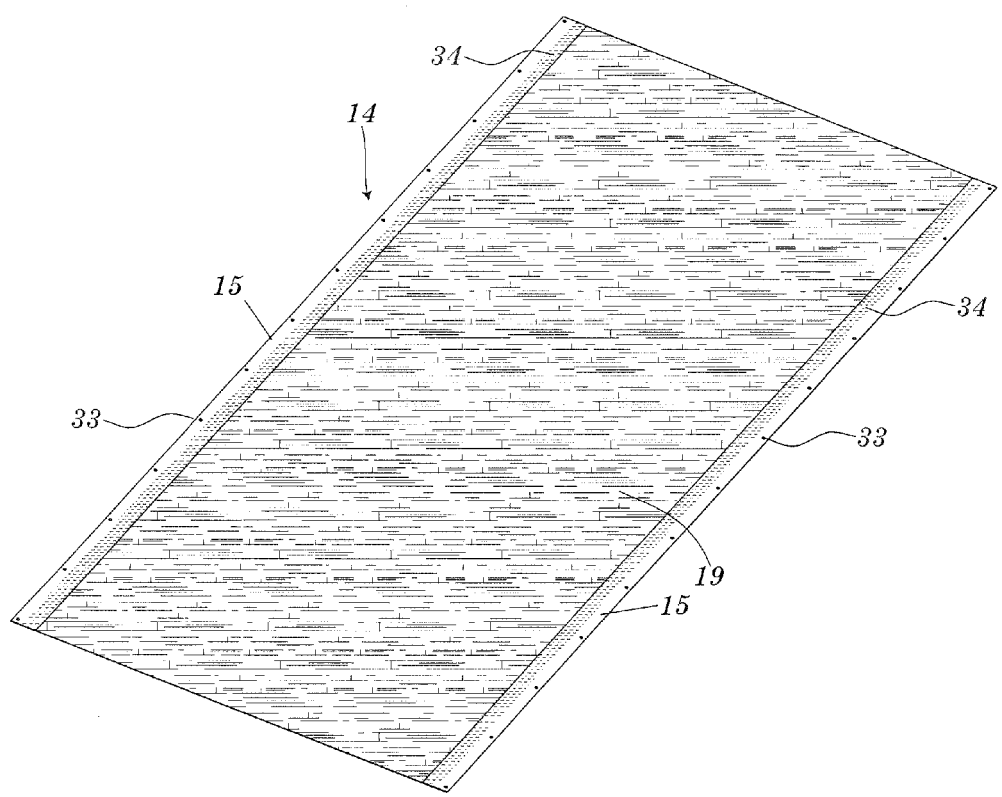
FIG. 6 shows the features of the PTFE flexible glazing comprising an optically transparent film, a foil vertical support, and anti-wear layers mechanically bonded to the PTFE film on both the bottom and top surface and at the vertical edges.
Figure 7:
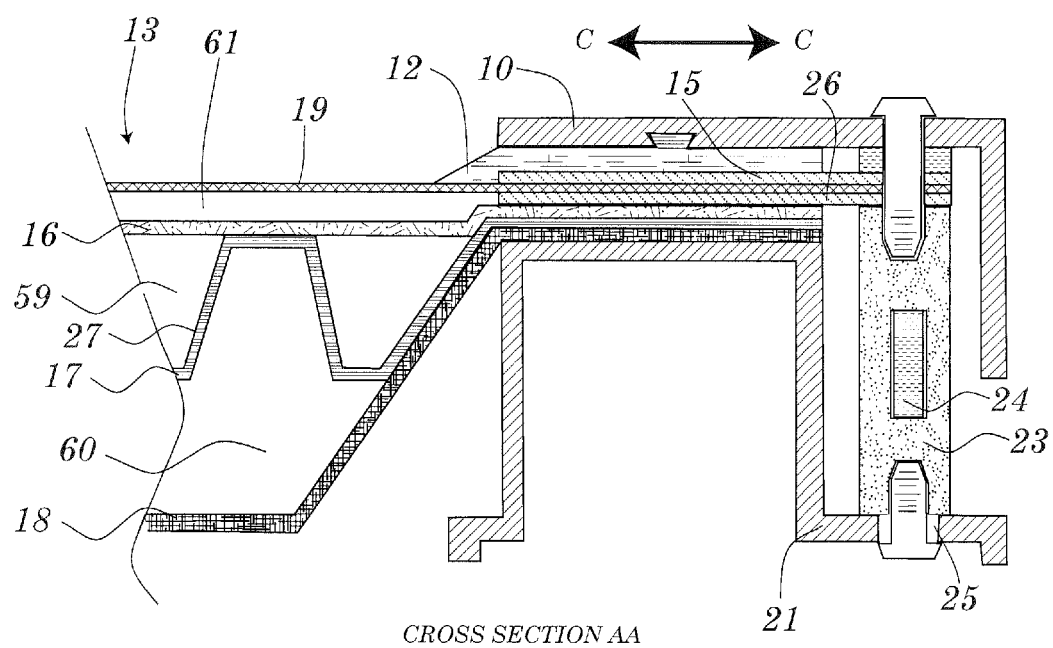
FIG. 7 is a cross sectional view of a panel assembly through plane AA as illustrated in FIG. 3.

FIG. 6 illustrates the construction of the, optically clear, flexible glazing 14 of panel 1. The glazing comprises an optically clear PTFE film 19 and metal foil wear strips on top 15 and 26 on bottom (FIG. 7). The PTFE film has a high optical clarity (95%), extended service temperature range, and superior tear and wear resistance. Although other materials such as PVDF film may be employed, PTFE film is superior because it is lighter and less fragile than glass and shows very little degradation over a long period of time. It also offers excellent mechanical strength, reliability, and ultraviolet stability because it is UV transparent. It's low surface energy means it is slow to get dirty, and easy to clean. PTFE is considered one of the best materials for outdoor applications due to its excellent weathering performance. PTFE has a melting point 327° C. (620° F.), well beyond the required 290° F. temperature range of any solar thermal panel. Although PTFE film has superior wear resistance, in long-term service, it is subject to tearing, especially in thin optically clear films of 0.002" thickness or less. In the preferred embodiment, 1" wide aluminum foil strips 15 on top and 26 bottom are ultrasonically seam welded at inner edge 34 on both sides of PTFE film 19, providing a permanent mechanical seal. In addition, the strips have punched mounting holes 33 to mount the panel 14 to side metal extrusions 10 as shown in FIG. 4. There are no foil strips on the top and bottom edges of film 19 because they would prevent the panel 14 from being automatically tensioned in direction CC. The gasket 12 captured between 11 and 20 provides an air-tight compression seal at both ends of the panel.

FIG. 7 is a cross section AA view of solar thermal panel 1 as illustrated in FIG. 3. It comprises a flexible solar thermal panel 13 and mounting hardware 19. Flexible panel 13 is assembled from optical PTFE glazing, 14, solar absorber 16, formed metal sheet 17, and flexible insulator 18. Additionally, optical PTFE glazing 14 incorporates an upper metal foil wear strip 15 and lower metal foil wear strip 26 mechanically bonded to the PTFE film 19. The panel 13 is held in place by attaching upper side extrusion 10 to the bottom side extrusion 21 via standoff 23 and two fasteners in multiple locations. Gasket 12, captured in place by 10, applies sealing pressure to the edges of panel 13. For automatic tensioning of the PTFE glazing 19, the glazing may move in horizontal direction CC because it is mechanically attached to side extrusion 10 and standoff 23. Spring 24 applies a constant spring pressure to standoff 23 which may move the maximum width of slot 25. The spring action of 24 on both sides of panel 13 provides the opposing force for tensioning of the PTFE film 19 along its entire length. The lower foil strip 26 mechanically attached to 19 protects against long-term wear and supplies additional hole 33 strength for attaching 19 to 23. FIG. 7 also illustrates the three air gaps or air passages that are incorporated into the panel. Gap 61 between glazing 19 and solar absorber 16 eliminates direct heat conduction and thereby heat loses out top surface of the panel 13. Gap 59 is the upper air passage where circulated air picks up heat from the back surface of solar absorber 16. Air exits this passage via hole 29 in formed panel 17 and the inner concentric port in duct connector 4. Gap 60 is the lower air passage between the formed metal sheet 17 and insulator 18. Air enters this passage at the back of panel 1 via the outer concentric port of dual-port duct connector 4.

Figure 8:
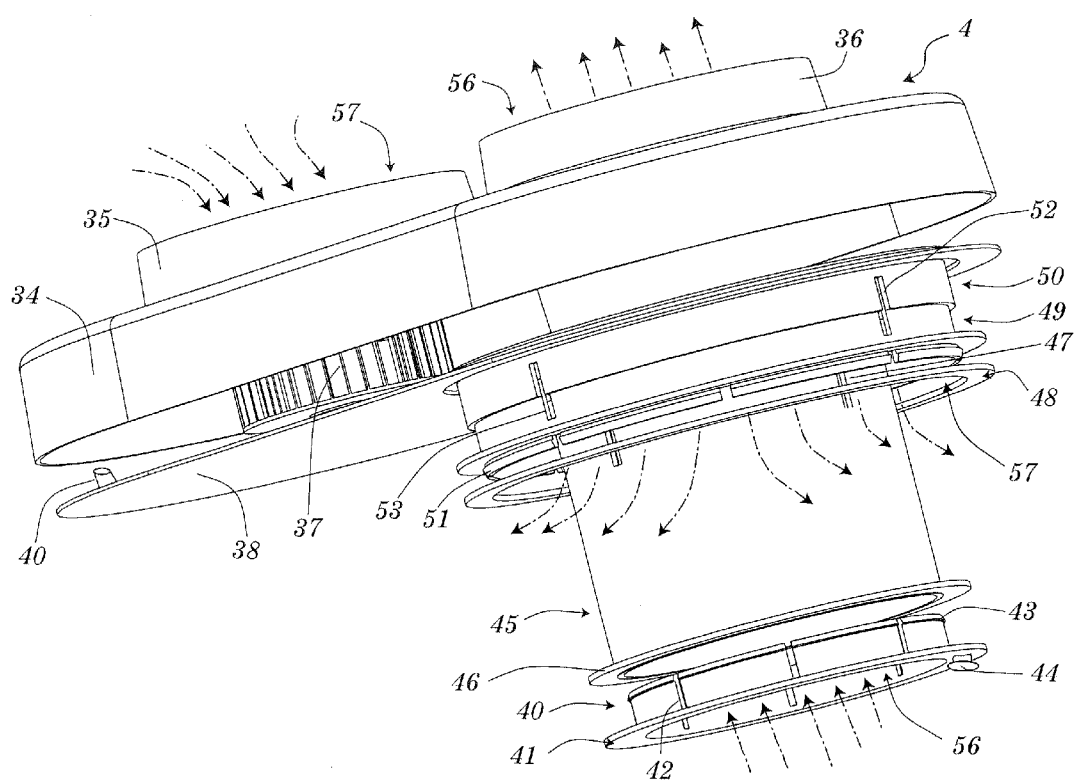
FIG. 8 is an exploded view of the bifurcated duct assembly illustrating assembly and its telescopic features.

FIG. 8 is an exploded view of the dual-port duct air adapter 4. In the embodiment illustrated, the input air passage 57 and output air passage 56 are coaxial. Duct port 35 on housing 34 is a male connection to inlet cold air feed duct 8. Duct port 36 on housing 34 is a connection to outlet or heated air duct 7. The outer diameter of 35 and 36 are selected to accommodate standard size ducts or duct adapters 9. Air circulated via squirrel cage fan 37 enters through 35 and is directed by housing 34 to flow in outer concentric passage 57 between 45 and the combination of 49 and 50. This air enters panel 13 and will flow in the lower air passage 60 created between formed panel 17 and insulator 18. The air travels the length of panel 13, circulates through the gaps 30 in formed panel 17 and returns via upper air passage 59. The heated air then exits through air passage 56 formed by 40, 45 and 36. This heated air then circulates through heated air return duct 7.

To accommodate variations in the thickness in the mounting surface 5, the preferred embodiment incorporates telescoping connections to panel 13. On the inlet air passage 57, the exterior wall of 49 may slide on the internal wall of 50. Features 52 and 53 provide stress reliefs and guides for the assembly. Additionally, a ring 48 snaps onto 49 via snap-lock feature 51. This provides a quick duct connection to the inlet duct hole 18 of the flexible panel 13. On the outlet duct, tubular component 45 may slide within the interior of duct connection 36. The circumference of 45 and interior circumference of 36 are selected to supply a light press fit. Additionally, retaining ring 40 will snap into 45 via the snap lock features 42 and 43. Top flange 41 at top of 40 and top flange 46 on 45 will create a seal around hole 29 in the formed panel 17. This provides an airtight exit duct connection from panel 13 to air duct 7.

The dual-port duct port assembly also incorporates sensor features to monitor the inlet air temperature, outlet air temperature and air flow velocity. The inlet air temperature sensor 40 is located in the inlet air passage 57. In the specific embodiment it is attached to the top surface of duct port back plate 38. The outlet air temperature sensor is located in the outlet air passage 56. In the specific embodiment the outlet air sensor 44 is shown attached to the top surface of ring 41. The sensor 44 may have a heat sink to increase the response to temperature fluctuations. The airflow sensor may be directly incorporated into the motor that spins fan 37.

Figure 9:
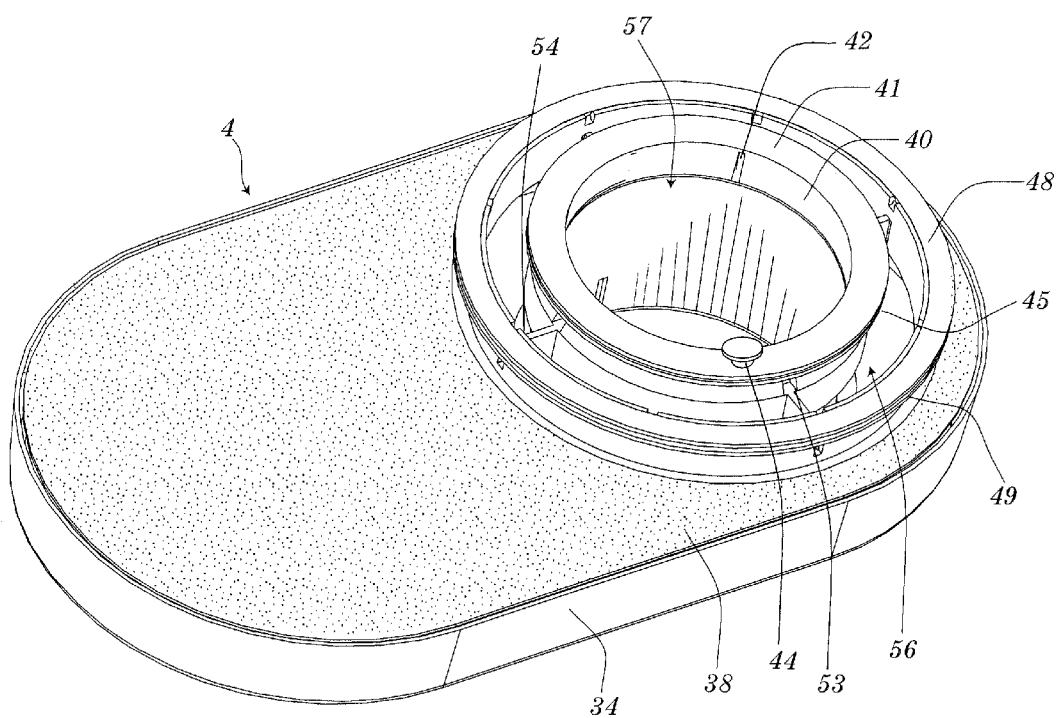
FIG. 9 is bottom view of bifurcated duct assembly illustrating the concentric inlet and outlet air passages.

FIG. 9 is an illustrated back view of dual-port duct adapter 4. This view shows air passage 57 located concentrically in the center of air passage 56. A series of radial arms 54 supports the center duct 45. Slots 53 in 49 permit the collar to slip over the arms providing the telescopic feature. The back 38 of the dual-port duct adapter 4 typically mounts directly on the interior surface 5 of the roof, wall or other support for panel 1.

The inner diameters of 40 and 49 are selected to prevent restriction of the airflow as air enters and exits through the ports. As an example, if the inner duct diameter of 40 is equal to 6 inches, and the inner diameter 49 is eight inches, then there is no airflow restriction. The cross sectional area of air passages 56 and air passage 57 are approximately equal at thirty square inches each.

Figure 10:
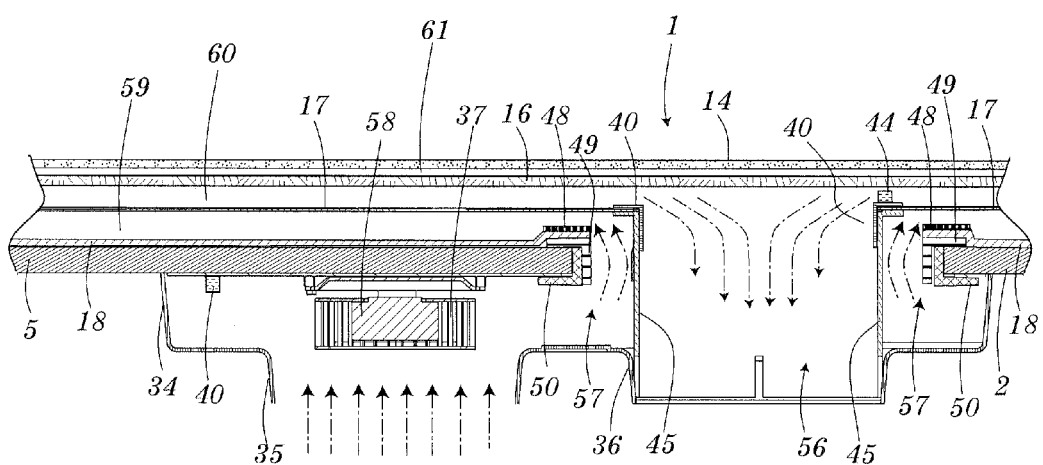
FIG. 10 is a cross sectional view through panel 1 and duct port adapter assembly as shown by plane BB in FIG. 3.

FIG. 10 is a cross sectional view CC as illustrated in FIG. 3. This cross sectional view illustrates the dual-port duct adapter 4 attached to panel 1 when mounted on a surface 2. Via positive air pressure generated by fan 37, air will enter through duct connector 35 and be forced through outer coaxial air passage 57 in duct port adapter 4. The air leaving 57 will then flow through lower air passage 59 in solar thermal panel 1. The air travels the length of panel 1 and flows through slots or holes 30 in formed panel 17 and then returns via air passage 60, where it will exit through inner coaxial passage 56 in duct port adapter 4. In transit, the air will be heated via solar radiation coincident on solar absorber 16, which converts solar radiation to heat via the process of absorption. To prevent air leakage, insulator 18 is locked into place on mounting surface 2 by the snap-lock action of the combination of snap ring 49 and inner collar 48. This combination will produce an airtight seal. Because 48 may slide within outer collar 50, the preferred embodiment may accommodate varying thicknesses of the mounting surface 5, providing a telescopic assembly. Similarly, feature 45 may slide within feature 36, accommodating varying thicknesses in 2. Snap-lock collar 40 provides an airtight seal at hole 29 in formed member 17.

The electric motor duct fan 37 comprising a fan motor and a squirrel cage fan blade will circulate air the entire length of solar thermal panel 1 and return through duct port 36. If solar radiation is incident upon the solar absorber 17 in thermal panel 1, the temperature of the circulating air will rise. The rise in temperature, or temperature differential from inlet duct 35 to outlet duct 36, may be measured by two separate temperature sensors; sensor 40 which measures the panel 1 inlet air flow temperature and sensor 44 which measures the panel 1 outlet temperature. By monitoring the volume of airflow through panel 1, the amount of energy generated measured as BTUs (British Thermal Units) may be calculated. In the preferred embodiment, the revolution rate (rpms) of the squirrel fan 37 is measured with a tachometer output from motor 58. This will measure the rotation rate in rpms (revolutions per minute) and by inference the amount of air displacement per revolution of the fan blades. An alternative embodiment is to use a mass airflow sensor that would directly measure the airflow in terms of cubic feet or cubic meters per minute. Additionally, by locating temperature sensor 44 in air passage 60 internal to panel 1 and in the path of the outlet airflow 56, a single temperature sensor may determine if the panel has reached a suitable set point temperature to start fan 37. When fan 37 is OFF the temperature measured will be the "static" air temperature within panel 1. When fan 37 is ON, the temperature measured by 44 will be the outlet airflow temperature. The signals from the sensors may communicate electrically to a remote monitoring device such as an LED display, microcontroller, or other electronic measurement system via an electrical connector.

Figure 11:
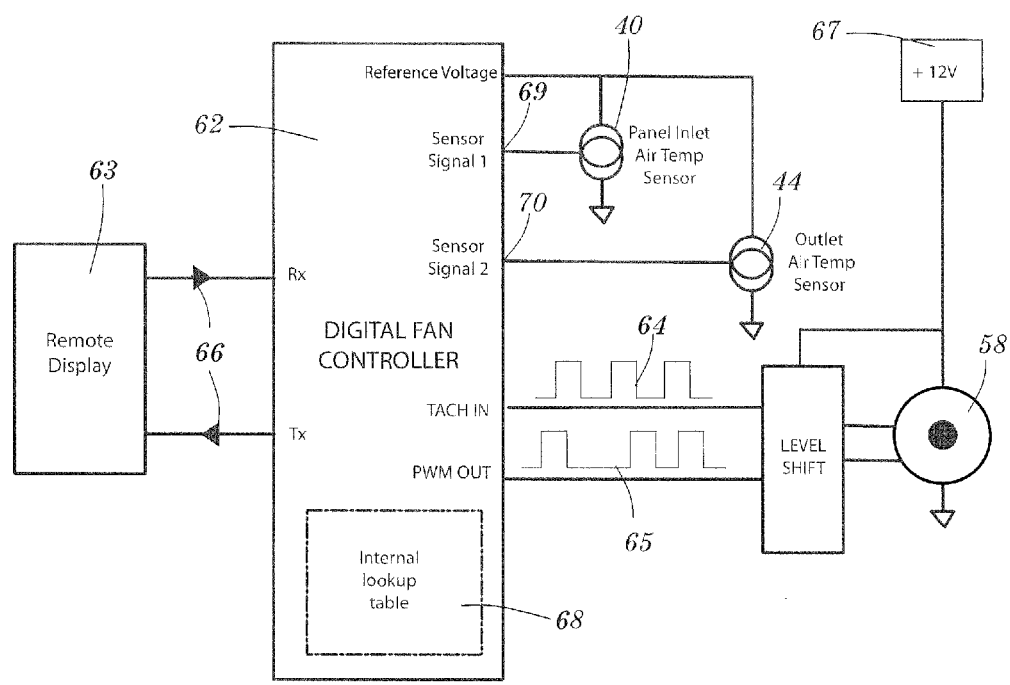
FIG. 11 is a simplified electrical schematic illustrating the control system used to measure panel temperature, BTUs produced, and control airflow volume through panel.

FIG. 11: To maximize energy output from solar thermal panel 1, fan 37 incorporates a variable speed feature. Motor 58 in fan 37 is a brushless dc type that has the ability to modulate its speed via a pulse width input 65. The duty cycle (ratio of logic high to logic low) may control the rotation speed of motor 58 and thereby airflow of fan 37 in infinite increments. It may be OFF to any speed up to the maximum rpm rate of the motor for a given supply voltage 67. In the specific embodiment it is 12 Volts. The dc brushless motor generates a tachometer signal 64 than be monitored by fan controller 62. The fan controller 62 also monitors the sensor signal 69 produced by sensor 40 and the sensor signal 70 produced by sensor 44. The two signals are low-level voltages that will be converted to a digital equivalent by fan controller 62. By measuring these three input variables, 69, 70 and 64, the digital logic fan controller 62 may calculate the BTUs produced by thermal panel 1. It uses a digital lookup table 68 that correlates the digital value of the three input variables to a specific BTU production. It may then modulate the PWM output signal 65 to vary the speed of the fan 37 and thereby maximize energy produced. The fan controller is typically a low cost microcontroller that accepts analog voltage signals and digital pulse trains. The total amount of energy produced in BTUs over a fixed period of time may also be transmitted over a pair of wires 66 to a remote display unit 63.

Various modifications, additions and alterations may be made to the invention by one skilled in the art without departing from the spirit and scope of the invention as defined in the appended claims.

What is claimed is:

1. A solar thermal panel with an air circulation system comprising:
   a back insulator panel;
   a solar absorber panel;
   a metal panel positioned between the insulator panel and the solar absorber panel, the metal panel and the solar absorber panel defining a first air passage and the metal panel and the back insulator panel defining a second air passage, the metal panel including at least one opening to connect the first air passage to the second air passage; and
   a telescoping bifurcated duct adapter having an air inlet port and an air outlet port, the telescoping bifurcated duct adapter configured to supply an isolated airflow from the inlet port to the outlet port through the first and second air passages, the telescoping bifurcated duct adapter further configured to interface with a single orifice in a mounting surface and including two concentric ducts capable of sliding relative to each other and configured to mate the first and second air passages to the single orifice and configured to provide a substantially airtight seal between the two concentric ducts.

2. The solar thermal panel of claim 1, wherein the air inlet port and the air outlet port of the telescoping bifurcated duct adapter are arranged coaxially with approximately equal cross sectional areas at respective inlet and outlet air duct connections to said solar thermal panel.

3. The solar thermal panel of claim 1, wherein said coaxially arranged each of the two concentric ducts includes a snap-lock feature configured to mate with a retaining ring.

4. The solar thermal panel of claim 3, wherein at least one of the ducts is mated with a retaining ring, the duct and mated retaining ring configured to create a seal with the metal panel.

5. The solar thermal panel of claim 3, wherein at least one of the ducts is mated with a retaining ring, the duct and mated retaining ring configured to create a seal with the back insulator panel.

6. The solar thermal panel of claim 1, wherein the two concentric ducts include an inner concentric duct and an outer concentric duct, the inner concentric duct supported within the outer concentric duct by one or more support structures.

7. The solar thermal panel of claim 1, wherein the metal panel includes one or more forms, the one or more forms including projections in opposing directions from the metal panel, the projections supporting the first and second air passages.

8. The solar thermal panel of claim 7, wherein the projections are trapezoidal or semi-spherical.

9. The solar thermal panel of claim 7, wherein a width of the first air passage and a width of the second air passage each correspond to a dimension of the supporting projection.

10. The solar thermal panel of claim 1, wherein the metal panel includes an opening configured to mate with at least one of the concentric ducts.

11. The solar thermal panel of claim 1, wherein the at least one opening of the metal panel is a gap between an end of the metal panel and the back insulator panel, the gap configured to permit air flow between the first and second air passages.

12. The solar thermal panel of claim 1, further comprising a flexible optical film above the solar absorber panel.

13. The solar thermal panel of claim 12, further comprising wear strips mechanically bonded to a top surface and bottom surface of at least two edges of the flexible optical film.

14. The solar thermal panel of claim 12, wherein the flexible optical film comprises polytetrafluoroethylene (PTFE) or polyvinylidene fluoride (PVDF).

15. The solar thermal panel of claim 13, wherein the wear strips include holes configured to attach the flexible optical film to a support frame.

16. The solar thermal panel of claim 1, wherein the bifurcated duct adapter further includes an electric fan, a first temperature sensor affixed to the air inlet port, a second temperature sensor affixed to the air outlet port, and an airflow sensor configured to measure the airflow through the bifurcated duct adapter.

17. The solar thermal panel of claim 16, further including a microprocessor configured to calculate energy production of the solar thermal panel using a temperature differential measured by the first and second temperature sensors and the airflow through the bifurcated duct adapter.

18. The solar thermal panel according to claim 16, further including a third temperature sensor in the air passage between the solar absorber panel and the metal panel.

19. A solar thermal panel according to claim 16, further including a microcontroller configured to control the electric fan based on the signals from the first and second temperature sensors and the airflow sensor.

20. The solar thermal panel of claim 1, wherein the bifurcated duct adapter further includes an electric fan having a microcontroller, the electric fan having a tachometer output signal and a digital lookup table stored in the microcontroller memory, the digital lookup table correlating the tachometer output signal to airflow across the fan.

21. The solar thermal panel of claim 1 further comprising a support frame configured to support the back insulator panel, the solar absorber panel, and the metal panel, the support frame including a spring mechanism configured to tension a flexible optical film across the solar absorber panel.

* * * * *

UNITED STATES PATENT AND TRADEMARK OFFICE
CERTIFICATE OF CORRECTION

PATENT NO. : 9,719,695 B2  Page 1 of 1
APPLICATION NO. : 14/145366
DATED : August 1, 2017
INVENTOR(S) : John E. Sylvan It is certified that error appears in the above-identified patent and that said Letters Patent is hereby corrected as shown below:

In the Claims

In Column 10, Claim 3, Lines 16-17, delete "said coaxially arranged"

Signed and Sealed this
Twelfth Day of September, 2017

Joseph Matal
*Performing the Functions and Duties of the*
*Under Secretary of Commerce for Intellectual Property and*
*Director of the United States Patent and Trademark Office*